United States Patent [19]
Rogers et al.

[11] Patent Number: 5,789,672
[45] Date of Patent: Aug. 4, 1998

[54] METERING ASSEMBLY WITH VAPOR BARRIER

[75] Inventors: Ivor Thomas Rogers, Luton, United Kingdom; Wayne David Samuel, Balwyn, Australia

[73] Assignee: ABB Kent PLC, Bedforshire, England

[21] Appl. No.: 351,346

[22] PCT Filed: Jun. 11, 1993

[86] PCT No.: PCT/GB93/01246

§ 371 Date: Jan. 16, 1996

§ 102(e) Date: Jan. 16, 1996

[87] PCT Pub. No.: WO93/25867

PCT Pub. Date: Dec. 23, 1993

[30] Foreign Application Priority Data

Jun. 12, 1992 [GB] United Kingdom ............ 9212465

[51] Int. Cl.⁶ .................... G01D 11/26; G01F 15/14
[52] U.S. Cl. .................... 73/201; 73/272 A; 73/273; 73/431; 324/156; 439/271
[58] Field of Search ............... 73/201, 273, 272 A, 73/272 R, 431, 866.1, 866.3; 324/156; 345/870.02, 693; 439/271

[56] References Cited

U.S. PATENT DOCUMENTS

| | | | |
|---|---|---|---|
| 3,093,973 | 6/1963 | Williams | 62/49 |
| 3,576,555 | 4/1971 | Struck | 340/870.02 |
| 3,599,022 | 8/1971 | Adair | 313/75 A |
| 3,720,106 | 3/1973 | Varga | 73/273 |
| 3,731,534 | 5/1973 | Painley et al. | 73/273 |
| 3,829,775 | 8/1974 | Block | 324/115 |
| 4,063,661 | 12/1977 | Doby | 324/156 X |
| 4,581,933 | 4/1986 | Mansley | 324/156 X |
| 5,049,810 | 9/1991 | Kirby et al. | 324/156 |
| 5,057,767 | 10/1991 | Keturakis et al. | 324/156 X |

FOREIGN PATENT DOCUMENTS

| | | |
|---|---|---|
| 1774578 | 2/1972 | Germany. |
| 8807780 | 10/1988 | WIPO. |

*Primary Examiner*—Thomas P. Noland
*Attorney, Agent, or Firm*—Hodgson, Russ, Andrews, Woods & Goodyear LLP

[57] ABSTRACT

A water meter has a glass window (30) having an aperture (32) through which extends one or more screw threaded terminals (20) enabling electrical connection to be made to an internal electronic encoder. A resilient grommet (34) is positioned in the aperture (32) and is held in compression between inner and outer sealing plates (36, 38). These are drawn together by the terminals which carry nuts.

15 Claims, 3 Drawing Sheets

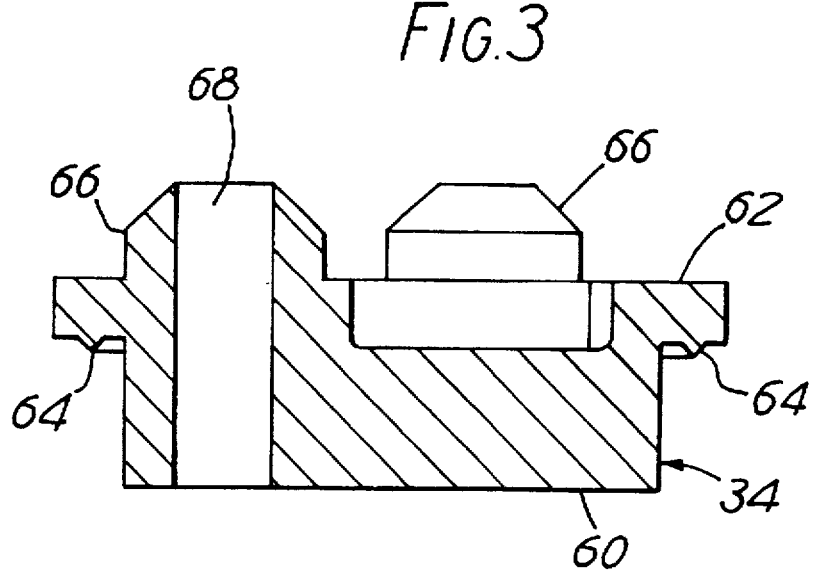
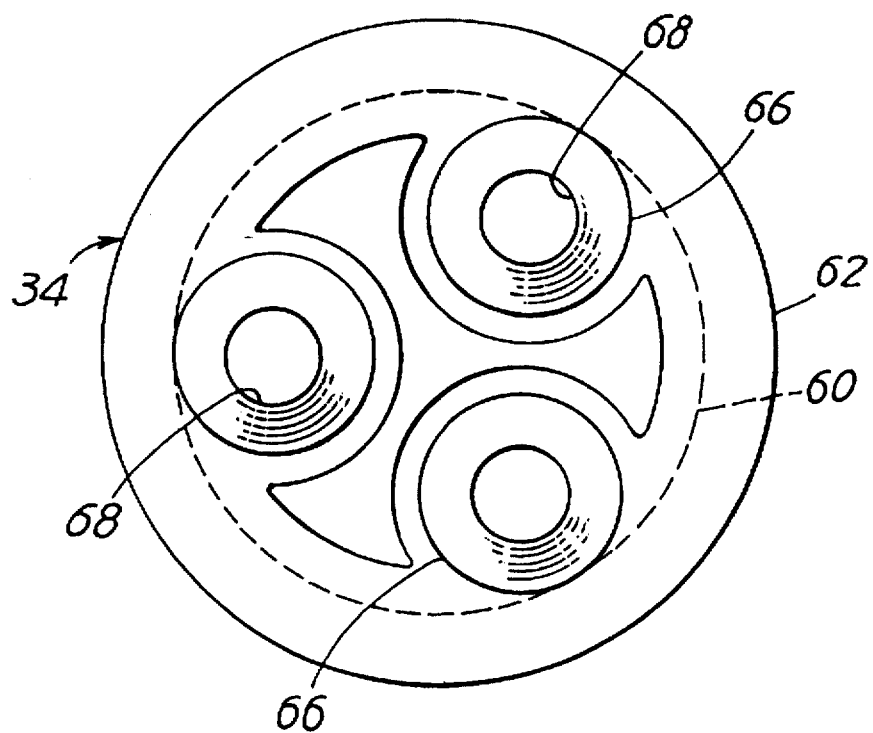

METERING ASSEMBLY WITH VAPOR BARRIER

BACKGROUND OF THE INVENTION

This invention relates to vapour barriers and particularly to methods and arrangements for passing electrical terminals through a glass or other wall, in vapour tight fashion.

In the most important example, the present invention relates to metering assemblies in which there is a dual requirement for a transparent window—enabling viewing of an internal number wheel or other display—and an electrical terminal passing through the transparent window—enabling a connection to be made between remote meter reading equipment and circuitry within the meter.

The example will be taken of a water meter, a traditional form of which comprises a bronze or copper housing having water inlet and outlet, a metering unit within the housing, a number wheel display and a glass cover through which the display can be read. There is more recently a requirement for such meters to be read electronically and circuitry has been developed which, in combination with the number wheel display, provides an electronic representation of the meter reading. Water meters are typically provided in pits, basements or other inaccessible locations and the electronic encoding facility enables the meter to be wired to a more conveniently located reading unit. This may take the form of a simple, slave display. More usually, the reading unit enables remote interrogation through communication with a portable reader unit or communication over telephone, radio or other links with a central reading station.

It is a requirement of the market that, in addition to the remote reading facility, the water meter should continue to have a number wheel or other display directly viewable at the meter. The meter housing must therefore continue to include a transparent window.

Because water meters are often mounted in pits or other constricted locations, it is only from the top that access to the meter can be guaranteed. It is therefore necessary or desirable for electrical connection to be made through the transparent window. Prior proposals have achieved this by forming the transparent window from plastics material, moulded about the electrical terminals. This solution appeared to offer important advantages. Established moulding techniques were available for moulding the plastics material around the terminals so as to support the terminals and to provide a vapour tight seal. In addition, correctly chosen plastics materials can provide greater resistance to breakage than glass.

In a typical example of these prior proposals, a polycarbonate cover has been developed, the shape of the cover being generally identical with a traditional glass cover but the plastics cover having integrally moulded terminals.

Severe problems have, however, been encountered with electrically encoding water meters having polycarbonate or other plastics covers. High rates of electronic circuit failure have been experienced and, at the lower temperatures at which water meters are frequently required to operate, condensation on the inside of the cover has interfered with manual reading.

One cause of these problems is believed to be the relatively higher vapour porosity of polycarbonate as compared with glass. Also, the difference in coefficients of thermal expansion of metal and plastics can provide vapour transmission paths as the meter assembly is subject to temperature variations. In many cases, these temperature variations can be extreme. The cyclic thermal expansion and contraction within the polycarbonate itself, can also promote leaking of water vapour through the cover.

Considerable work has gone into overcoming these problems. One approach is to replace a simple polycarbonate cover by a laminated plastics construction designed to offer superior moisture barrier properties. This is not, however, believed to be a complete solution since the problem of differential thermal expansion and contraction will remain. It has been suggested that the risk of electronic circuit failure through vapour incursion could be reduced by coating or potting of the circuitry. However, a typical encoding arrangement incorporates brush wipers making electrical connection with commutator pads. These components cannot of course be coated. These approaches also fail to deal with the problem of fogging or condensation.

In a still further alternative it has been proposed to fill the internal volume of the meter assembly with an appropriate oil. There will remain, however, the risk of vapour transmission through incomplete filling of the internal volume. The passage of water vapour to the electronic circuitry is therefore delayed but not prevented. Also, there is a risk that in time the passage of water into the internal volume will form an opaque emulsion with the oil. Further difficulties are that temperature induced changes in viscosity of the oil may affect the accuracy of the meter assembly. It has already been noted that water meters and other utility meters are often subject to extreme shifts in temperature.

It is one object of the present invention to provide an improved metering assembly which overcomes these difficulties, at least in large part.

SUMMARY OF THE INVENTION

Accordingly, the present invention consists in one aspect in a metering assembly comprising a housing having a transparent window; a metering unit disposed in the housing and having a display viewable through the window; electronic encoding means within the housing, connected to the metering unit to provide an electronic representation of the reading; and terminal means enabling connection to be made externally of the metering assembly with the encoding means, wherein the window is formed of glass having an aperture, the terminal means extends through the aperture and sealing means are provided to form a vapour seal between the terminal means and the glass window.

Advantageously, the sealing means comprises a body of resilient material abutting the terminal means and the glass window, in compression.

Preferably, the sealing means comprises a grommet located at the glass aperture and having at least one through bore for the passage of the terminal means.

Suitably, the terminal means comprises at least two terminals and wherein the grommet comprises a through bore for each of the terminals.

According to a further aspect, the present invention consists in a terminal structure for establishing an electrical connection through a glass or other wall, in vapour proof fashion, comprising a first clamping plate disposed externally of the glass window and having at least one terminal hole; a grommet located at the glass aperture and having at least one terminal bore; a second clamping plate positioned internally of the glass window and having at least one terminal hole; and terminal means comprising at least one terminal extending through the first and second clamping plates and the grommet, the terminal having screw thread engaging parts, relative rotation of which serves to draw together the first and second clamping plates.

BRIEF DESCRIPTION OF THE DRAWING

FIG. 3 is a cross-section, to an enlarged scale, of the sealing element utilised in the arrangement of FIG. 2;

FIG. 4 is a plan elevation of the sealing element shown in FIG. 3; and

DETAILED DESCRIPTION OF THE ILLUSTRATED EMBODIMENT

Figure 1:
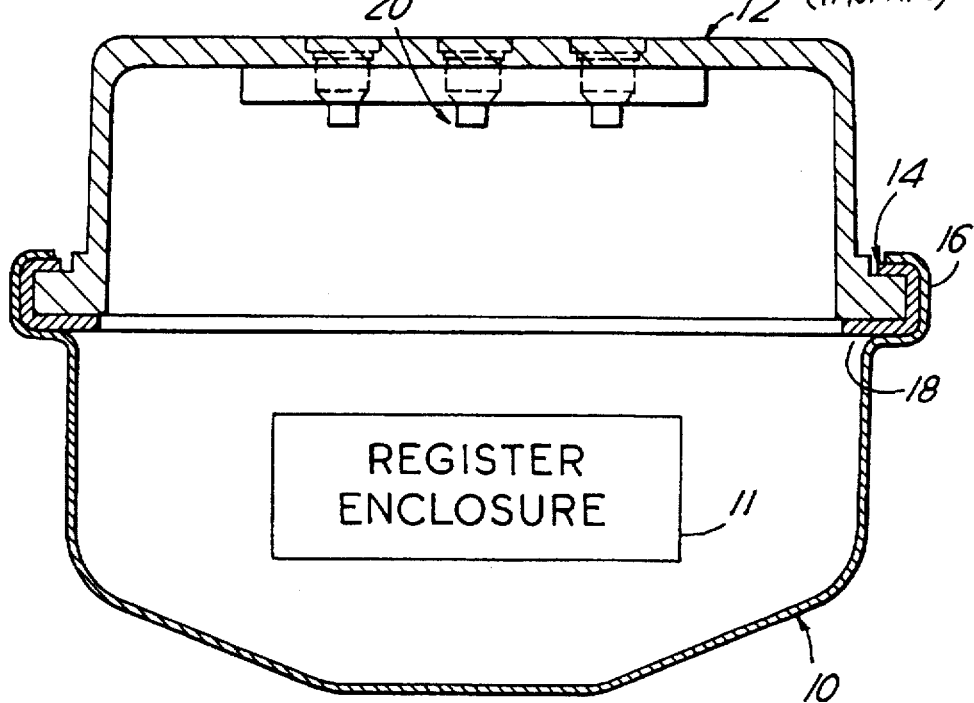
FIG. 1 is a cross-section through a meter assembly according to the prior art.

Referring initially to FIG. 1, there is shown a meter assembly according to the prior art. A metal, cup-shaped housing 10 provides an enclosure for the register or metering unit 11. The assembly is closed by a domed polycarbonate cover 12 having an integral mounting flange 14. This is received within a lip 16 of the metal housing. A J-section seal 18 is interposed between the plastics cover and the metal housing to provide a vapour proof seal.

A series of, typically, three terminals 20 are insert moulded into the plastics cover 12. These provide electrical connection to the internal encoding circuitry (not shown). The transparent plastics cover enables visual inspection of the number wheel or other display (not shown).

It is found that when meter assemblies of this structure are subjected to the levels of humidity and the extremes in temperature encountered, for example, in a water meter pit, there is a significant ingress of water vapour. As has been explained, this may interfere with the functioning of the electronic and electromechanical components within the housing. Also, condensation on the internal surface of the plastics cover 12 may interfere with manual reading of the meter. It is believed that vapour transmission paths arise in two ways. First, the polycarbonate cover is not totally impervious to water vapour. Second, differential thermal expansion between the terminals and the surrounding regions of the polycarbonate cover may lead to vapour paths opening as temperature cycles.

The present invention involves a radical shift in thinking. Instead of adding further laminate to the plastic cover to reduce vapour permeability or taking steps to protect circuitry from vapour which unavoidably enters the enclosure, this invention proposes a return to glass. Surprisingly, it has been recognised that with an appropriate sealing arrangement, terminals can pass through a simple aperture machined or otherwise formed in the glass cover.

Figure 2:
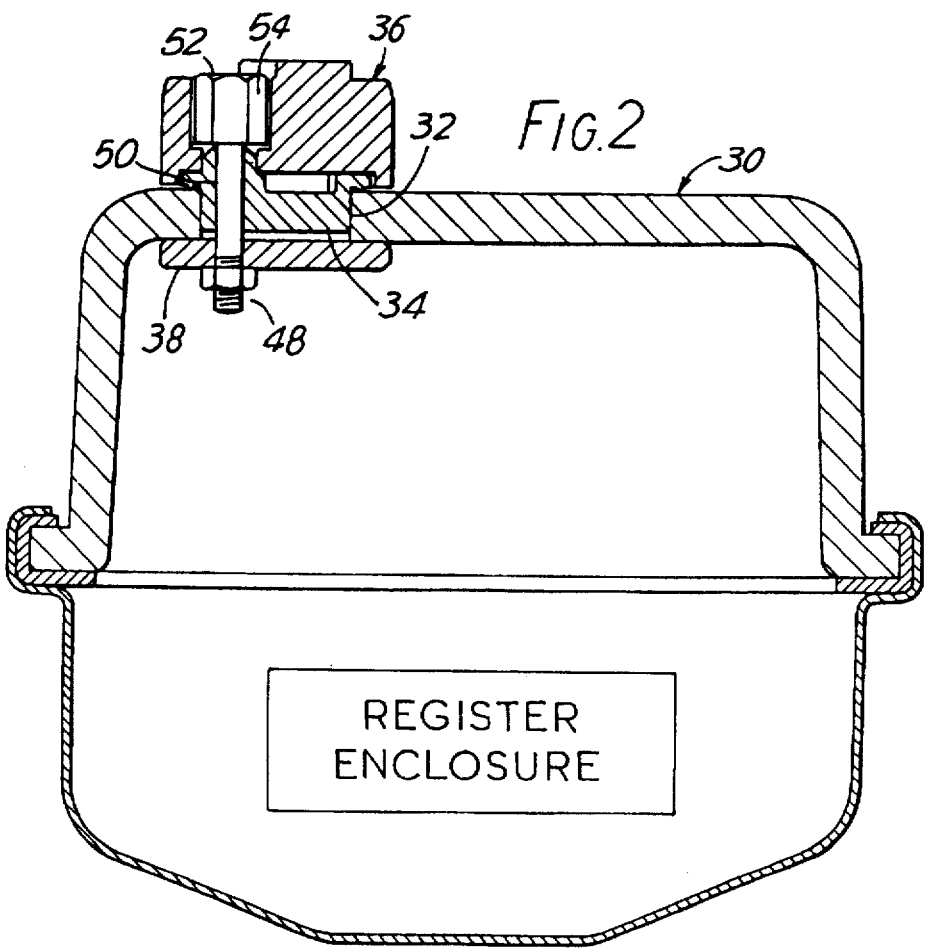
FIG. 2 is a cross-section through a meter assembly according to the present invention.

Turning now to FIG. 2, there is shown a metering assembly in accordance with the present invention. The polycarbonate cover of the prior art is replaced by a moulded glass cover 30. In this example borosilicate glass was selected for its vapour transmission barrier properties, moulding capabilities, mechanical strength, thermo-dimensional stability and optical transmissivity. Borosilicate glass is also resistant to chemical attack. The choice of wall thickness for the glass cover is a compromise of cost against mechanical strength; in this example a wall thickness of 5 to 6 mm is employed.

The glass cover is moulded with a blind recess. This enables a drilled hole to be initiated below the surface of the glass to produce the required aperture 32 whilst leaving the margin of the aperture smooth and undamaged. A rubber grommet 34 is located within the aperture 32 as an interference fit. Ethylene propylene rubber (EPR or EPDM) was selected as the preferred rubber material for its excellent resistance to weathering, ozone and water vapour permeation; good low and high temperature capabilities; excellent resistance to set and good resilience. Whilst this is the preferred choice, it will be recognised that a wide variety of other rubbers or other resilient materials could be employed.

The grommet 34 is effectively sandwiched between an outer sealing plate 36 and an inner sealing plate 38. As will later be described in more detail, these are brought together in a clamping action by tightening of the nut 48 on terminal shank 50, with each terminal head 52 being held captive within a complimentarily shaped recess 54 in the outer sealing plate 36.

The form of the grommet 34 is seen most clearly from the component drawings at FIGS. 3 and 4.

The grommet 34 has a cylindrical portion 60 with a flange 62. An annular projection 64 is provided at the underside of the flange 62, essentially forming a sealing ring. Three bosses 66, equally angularly spaced, extend upwardly. Coaxial with each boss 66, is a terminal bore 68 which passes axially through the grommet. The upper surface of each boss 66 is chamfered.

Figure 5:
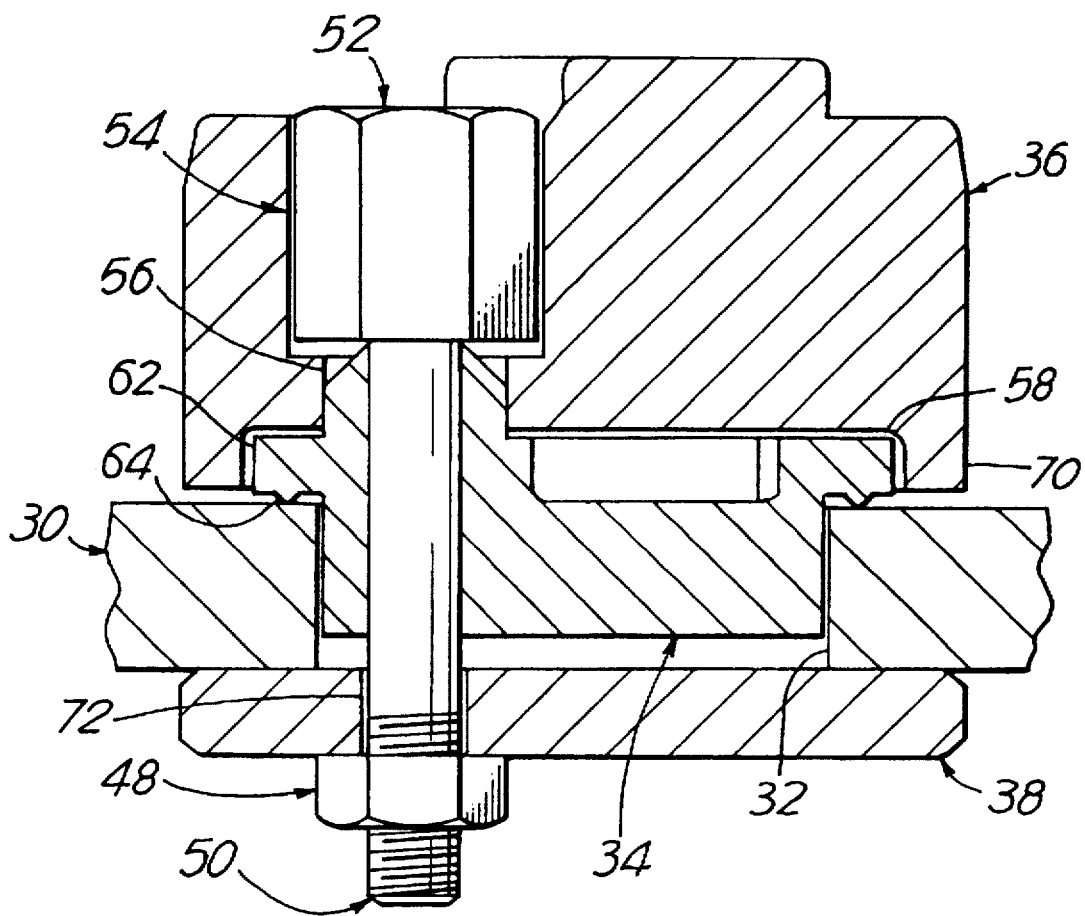
FIG. 5 is a part view from FIG. 2, to an enlarged scale.

Reference is now directed to FIG. 5 which shows the sealing arrangement of FIG. 2, to an enlarged scale.

The outer sealing plate 36 has three hexagonal recesses 54, shaped to capture the head 52 of each terminal. The recesses 54 open into holes 56 which in turn open into a disk shaped cavity 58 bounded by an annular skirt 70.

The lower sealing plate 38 takes the form of a disk with three holes 72 receiving the respective terminals 50. A nut 48, screw threadedly engaged with the end of each terminal 50, completes the structure.

The manner in which an efficient sealing engagement is achieved can best be understood through a description of the method of assembly of the described sealing arrangement.

The rubber grommet 34 is first engaged as an interference fit within the aperture 32. The flange 62 overlies the glass 30 at the margin of the aperture with contact confined to the sealing ring 64. The outer sealing plate 36 is placed over the grommet 34 with the flange 62 being received in recess 58 and with each boss 66 extending through the corresponding terminal hole 56 and entering the hexagonal recess 54.

The three terminals 50 are then inserted through the holes in the outer sealing plate 36 and the aligned bores 64 in the grommet. The central shank portion of each terminal is arranged to provide an interference fit within the grommet bore 68. If it is necessary to facilitate insertion, the terminals can be pre-greased with, for example, a silicon based grease.

The hexagonal bolt heads 52 of the terminals are captive in the hexagonal recesses 54 and rest on the chamfered extremities of the respective bosses 66. The inner sealing plate 38 is offered over the screw threaded terminal ends 50 and the nuts 48 are engaged and tightened.

Whilst no clamping force is inserted between the inner and outer sealing plates and the grommet 34 is in a relatively uncompressed state, two possible vapour paths exist between the ambient air and the enclosure of the meter assembly. One path exists between the cylindrical glass aperture surface and the outside diameter of cylindrical grommet portion 60, the other follows the shank of each terminal. It will be recognised that in each case there is a degree of sealing by virtue of the described interference fits. The length of each boss improves the degree of sealing about the terminals. The seals are not however vapour proof.

As the nuts 48 are tightened and the clamping force applied between the inner and outer sealing plates increases, the inner sealing plate 34 engages hard against the interior glass surface and each terminal head 52 is forced to the bottom of the associated recess 54, compressing the bosses 66. This effects a seal about each terminal shank. As the clamping force increases, the outer sealing plate 36 is drawn towards the exterior glass surface so compressing the flange 62 and flattening the sealing ring 64.

It will be recognised that in this way the two vapour transmission paths which exist at the intermediate stage of manufacture are efficiently and completely blocked. It will be seen that the inner and outer sealing plates 36 and 38 serve with the screw threaded terminals to apply a clamping force to the grommet; they do not directly perform a sealing function. The annular skirt 70 will in practice approach the exterior glass surface very closely. This has the important benefit of shielding the rubber grommet from environmental contaminants. Whilst there will be differential thermal expansion between the metal terminals and the glass cover, the elastomeric nature of the grommet will ensure efficient sealing.

It is important further to note that sealing is effected at the exterior surface of the glass cover. This, as noted above, is left blemish free in the manufacturing process so as to promote good sealing. Importantly, the thickness of the glass cover is not a material factor in the sealing. Relatively wide tolerances in the thickness can therefore be accommodated. It is also important to note that sealing is not dependent upon an attempt to compress solid rubber or other grommet material.

Tests have been conducted to compare the rate of water vapour incursion in the described arrangement with a meter having a solid glass window and no terminals and a prior art meter having a plastics window and moulded terminals. The vapour tightness of the described arrangement was found to be of the same order and in fact slightly better a solid glass arrangement. The improvement can perhaps be attributed to factors outside this invention; what is noteworthy is that the provision of terminals has been achieved in the present invention without introducing a material leakage path. By contrast, the moulded plastics window having integral terminals was found to admit vapour at a rate three times greater than that of the glass window.

It should be understood that this invention has been described by way of example only and a wide variety of modifications are possible without departing from the scope of the invention. Thus, whilst the use of a single grommet accommodating two, three or even more terminals has useful advantages, the invention encompasses the provision of one grommet per terminal. In such an arrangement, and indeed in other arrangements, the desired clamping action may be achieved with simple washers on the terminal shank or indeed by the terminal head and terminal nut, directly.

The specific problem of water vapour has been discussed in detail but sealing is also effective against other vapours or gases.

Whilst this invention has been described specifically in relation to water meters, it will be useful in a variety of utility metering and other situations in which the dual function are required of a meter reading window and electrical termination through that window. Indeed, the invention will find still broader application in establishing an electrical connection through a glass or other wall in a manner which prevents (or severely restricts) vapour or gas transmission.

We claim:

1. A metering assembly comprising a housing having a transparent window; a metering unit disposed in the housing and having a display viewable through the window; electronic encoding means within the housing, connected to the metering unit to provide an electronic representation of the reading; and terminal means enabling electrical connection to be made externally of the metering assembly with the encoding means, wherein the window is formed of glass having an aperture, the terminal means extends through the aperture and sealing means are provided to form a vapor seal between the terminal means and the glass window.

2. An assembly according to claim 1, wherein the sealing means comprises a body of resilient material abutting the terminal means and the glass window, in compression.

3. An assembly according to claim 1 or claim 2, wherein the sealing means comprises a grommet located at the glass aperture and having at least one through bore for the passage of the terminal means.

4. An assembly according to claim 3, wherein the terminal means comprises at least two terminals and wherein the grommet comprises a through bore for each of the terminals.

5. An assembly according to claim 1, wherein the sealing means comprises an annular flange abutting the external surface of the glass window at a margin of the aperture.

6. An assembly according to claim 1, wherein the sealing means comprises a grommet clamped in compression.

7. An assembly according to claim 6, wherein the grommet is clamped in compression by clamping means of which the terminal means forms an operative part.

8. An assembly according to claim 7, wherein the terminal means comprises at least one terminal having screw thread engaging parts.

9. An assembly according to claim 1, wherein the sealing means comprises a first clamping plate disposed externally of the glass window and having at least one terminal hole; a grommet located at the glass aperture and having at least one terminal bore; a second clamping plate positioned internally of the glass window and having at least one terminal hole; and at least one terminal extending through the first and second clamping plates and the grommet, the terminal having screw thread engaging parts, relative rotation of which serves to draw together the first and second clamping plates.

10. An assembly according to claim 9, wherein the terminal means comprises at least two like terminals, each extending through the first and second clamping plates and through the grommet.

11. An assembly according to claim 9 or claim 10, wherein the grommet comprises a flange which abuts the external surface of the glass window at a margin of the aperture.

12. An assembly according to claim 11, wherein the flange has an annular projection engaging the external surface of the glass window.

13. An assembly according to claims 9 or 10, wherein a screw thread engaging part of each terminal is held against rotation in one of the clamping plates.

14. An assembly according to claims 9 or 10, wherein the grommet has an integral boss extending into each terminal hole of the first clamping plate.

15. An assembly according to claims 9 or 10, wherein the first clamping plate has an annular skirt projecting toward the glass window to provide environmental protection for the grommet.

* * * * *